(12) United States Patent
Xu et al.

(10) Patent No.: US 10,924,966 B2
(45) Date of Patent: Feb. 16, 2021

(54) MANAGEMENT METHOD, MANAGEMENT UNIT, AND SYSTEM

(71) Applicant: Huawei Technologies Co., Ltd., Shenzhen (CN)

(72) Inventors: Ruiyue Xu, Shanghai (CN); Lan Zou, Shanghai (CN); Yan Zhou, Shanghai (CN); Yan Li, Shanghai (CN); Jun Wang, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/422,116

(22) Filed: May 24, 2019

(65) Prior Publication Data

US 2019/0281503 A1 Sep. 12, 2019

Related U.S. Application Data

(63) Continuation of application No. PCT/CN2016/107153, filed on Nov. 24, 2016.

(51) Int. Cl.
*H04W 28/24* (2009.01)
*H04W 28/16* (2009.01)
(Continued)

(52) U.S. Cl.
CPC ......... *H04W 28/24* (2013.01); *H04L 41/042* (2013.01); *H04L 41/0803* (2013.01);
(Continued)

(58) Field of Classification Search
None
See application file for complete search history.

(56) References Cited

U.S. PATENT DOCUMENTS

| 10,117,137 B2 | 10/2018 | Rommer et al. |
| 10,694,389 B2 | 6/2020 | Xu et al. |

(Continued)

FOREIGN PATENT DOCUMENTS

| CN | 103905523 A | 7/2014 |
| CN | 104125091 A | 10/2014 |

(Continued)

OTHER PUBLICATIONS

Machine Translation and Abstract of Chinese Publication No. CN105812217, Jul. 27, 2016, 16 pages.

(Continued)

*Primary Examiner* — Anh Vu H Ly
(74) *Attorney, Agent, or Firm* — Conley Rose, P.C.

(57) ABSTRACT

A management method includes receiving, by a first management unit, a first management request, where the first management request carries requirement information of a network slice or indication information, and the indication information is used to obtain the requirement information of the network slice. The method further includes obtaining, by the first management unit, requirement information of a first subnet based on the requirement information of the network slice, and determining, by the first management unit, requirement information of a first network resource required by the first subnet, where the requirement information of the first network resource is used to select, create, configure, activate, or request a first network resource instance that satisfies the requirement information of the first network resource.

20 Claims, 6 Drawing Sheets

(51) Int. Cl.
*H04W 16/02* (2009.01)
*H04W 24/02* (2009.01)
*H04W 72/04* (2009.01)
*H04W 28/26* (2009.01)
*H04L 12/24* (2006.01)

(52) U.S. Cl.
CPC .......... *H04L 41/50* (2013.01); *H04L 41/5003* (2013.01); *H04L 41/5006* (2013.01); *H04L 41/5051* (2013.01); *H04W 16/02* (2013.01); *H04W 24/02* (2013.01); *H04W 28/16* (2013.01); *H04W 28/26* (2013.01); *H04W 72/0493* (2013.01)

(56) References Cited

U.S. PATENT DOCUMENTS

| | | |
|---|---|---|
| 2010/0161916 A1 | 6/2010 | Thornton et al. |
| 2012/0233302 A1 | 9/2012 | Kallin et al. |
| 2013/0007232 A1 | 1/2013 | Wang et al. |
| 2013/0208792 A1 | 8/2013 | He et al. |
| 2014/0086177 A1 | 3/2014 | Adjakple et al. |
| 2014/0269295 A1 | 9/2014 | Anumala |
| 2014/0280864 A1 | 9/2014 | Yin et al. |
| 2015/0281073 A1 | 10/2015 | Kotha et al. |
| 2015/0358399 A1 | 12/2015 | Baugher et al. |
| 2016/0006623 A1 | 1/2016 | Liu et al. |
| 2016/0142246 A1 | 5/2016 | Wang et al. |
| 2016/0255535 A1 | 9/2016 | Foy et al. |
| 2016/0353465 A1 | 12/2016 | Vrzic et al. |
| 2017/0070892 A1* | 3/2017 | Song .................. H04L 41/042 |
| 2017/0079059 A1* | 3/2017 | Li ........................ H04W 16/02 |
| 2017/0142591 A1* | 5/2017 | Vrzic .................. H04L 47/2408 |
| 2017/0180213 A1 | 6/2017 | Li et al. |
| 2017/0208011 A1 | 7/2017 | Bosch et al. |
| 2017/0237656 A1 | 8/2017 | Gage |
| 2017/0245316 A1 | 8/2017 | Salkintzis |
| 2017/0289791 A1 | 10/2017 | Yoo et al. |
| 2018/0041904 A1 | 2/2018 | Shimojou et al. |
| 2018/0103368 A1 | 4/2018 | Son et al. |
| 2018/0132138 A1* | 5/2018 | Senarath .................. H04L 47/78 |
| 2018/0139106 A1* | 5/2018 | Senarath .................. H04L 67/16 |
| 2018/0139660 A1 | 5/2018 | Rommer et al. |
| 2018/0184331 A1* | 6/2018 | Samdanis ............. H04W 28/16 |
| 2018/0247244 A1 | 8/2018 | Wang |
| 2018/0287894 A1* | 10/2018 | Senarath ............. H04L 41/5019 |
| 2018/0316564 A1* | 11/2018 | Senarath ............. H04L 41/5006 |
| 2018/0324187 A1 | 11/2018 | Heintel et al. |
| 2018/0352501 A1* | 12/2018 | Zhang .................. H04W 48/14 |
| 2018/0368056 A1 | 12/2018 | Wang et al. |
| 2019/0029000 A1* | 1/2019 | Vikberg ................ H04W 68/00 |
| 2019/0037531 A1* | 1/2019 | Pantus ................ H04W 68/005 |
| 2019/0075512 A1* | 3/2019 | Jin ........................ H04W 48/08 |
| 2019/0109768 A1* | 4/2019 | Senarath ............. H04L 41/0681 |
| 2019/0140921 A1* | 5/2019 | Xu ........................ H04W 28/26 |
| 2019/0140972 A1* | 5/2019 | Xu .......................... H04L 67/10 |
| 2019/0158653 A1 | 5/2019 | Sonntag |
| 2019/0159119 A1* | 5/2019 | Djordjevic .............. H04W 8/18 |
| 2019/0182752 A1* | 6/2019 | Lou ...................... H04W 48/06 |
| 2019/0230725 A1 | 7/2019 | Lou et al. |
| 2019/0260636 A1* | 8/2019 | Sun ...................... H04L 41/082 |
| 2019/0261186 A1* | 8/2019 | Xu ........................ H04W 28/24 |
| 2019/0289647 A1* | 9/2019 | Li ........................ H04L 41/0896 |
| 2019/0327153 A1* | 10/2019 | Wahlqvist ........... H04L 41/5003 |
| 2019/0349792 A1* | 11/2019 | Xu ........................ H04L 41/042 |
| 2019/0386925 A1* | 12/2019 | Ji .......................... H04W 28/18 |
| 2020/0014589 A1* | 1/2020 | Xu ...................... H04L 41/0806 |
| 2020/0014608 A1* | 1/2020 | Xu ...................... H04L 41/5051 |
| 2020/0052969 A1* | 2/2020 | Xu .......................... H04L 41/12 |
| 2020/0053531 A1* | 2/2020 | Myhre ................. H04W 48/18 |
| 2020/0059987 A1* | 2/2020 | Hong .................... H04W 76/27 |
| 2020/0163011 A1* | 5/2020 | Xu ...................... H04L 41/0893 |
| 2020/0177460 A1* | 6/2020 | Xu ........................ H04W 24/02 |
| 2020/0177462 A1* | 6/2020 | Jia ......................... H04W 48/12 |
| 2020/0178122 A1* | 6/2020 | Xu ...................... H04L 41/0806 |
| 2020/0195511 A1* | 6/2020 | Yang .................... H04W 24/04 |
| 2020/0213937 A1* | 7/2020 | Yang .................. H04L 41/0806 |
| 2020/0228990 A1* | 7/2020 | Xu ........................ H04W 16/18 |
| 2020/0280493 A1* | 9/2020 | Xu ...................... H04L 41/0886 |
| 2020/0287800 A1* | 9/2020 | Xu .......................... H04L 41/50 |

FOREIGN PATENT DOCUMENTS

| | | |
|---|---|---|
| CN | 104243196 A | 12/2014 |
| CN | 104639653 A | 5/2015 |
| CN | 104917809 A | 9/2015 |
| CN | 105281955 A | 1/2016 |
| CN | 105391568 A | 3/2016 |
| CN | 105812217 A | 7/2016 |
| CN | 106060900 A | 10/2016 |
| JP | 2015162843 A | 9/2015 |
| WO | 2015021248 A1 | 2/2015 |
| WO | 2016152588 A1 | 9/2016 |

OTHER PUBLICATIONS

Machine Translation and Abstract of Chinese Publication No. CN106060900, Oct. 26, 2016, 20 pages.

"3rd Generation Partnership Project; Technical Specification Group Services and System Aspects; Study on Architecture for Next Generation System (Release 14)," 3GPP TR 23.799, V1.1.0, Oct. 2016, 501 pages.

"3rd Generation Partnership Project; Technical Specification Group Services and System Aspects; Feasibility Study on New Services and Markets Technology Enablers; Stage 1 (Release 14)," 3GPP TR 22.891, V14.2.0, Sep. 2016, 95 pages.

Foreign Communication From A Counterpart Application, PCT Application No. PCT/CN2016/107153, English Translation of International Search Report dated Aug. 15, 2017, 2 pages.

Foreign Communication From A Counterpart Application, PCT Application No. PCT/CN2016/107153, English Translation of Written Opinion dated Aug. 15, 2017, 5 pages.

Office Action dated Oct. 3, 2019, U.S. Appl. No. 16/399,426, filed Apr. 30, 2019, 18 pages.

Foreign Communication From A Counterpart Application, European Application No. 16919894.2, Extended European Search Report dated Sep. 25, 2019, 12 pages.

Kiyohide Nakauchi, et al., "Software-Defined Exchange for the Virtualized WiFi Network towards Future Mobile Cloud Services," 2016 IEEE International Conference on Communications Workshops (ICC), Workshops: W11-Workshop on Orchestration for Software-Defined Infrastructures (O4SDI), IEEE, May 23, 2016, 9 pages.

Ongkasae, K., et al., "QoS Implementation in System Wide Information Management (SWIM) Network Model," IEEE Twelfth International Symposium on Autonomous Decentralized Systems, 2015, pp. 181-184.

* cited by examiner

MANAGEMENT METHOD, MANAGEMENT UNIT, AND SYSTEM

CROSS-REFERENCE TO RELATED APPLICATIONS

This application is a continuation of International Patent Application No. PCT/CN2016/107153, filed on Nov. 24, 2016, the disclosure of which is hereby incorporated by reference in its entirety.

TECHNICAL FIELD

Embodiments of the present disclosure relate to the communications field, and in particular, to a management method, a management unit, and a system.

BACKGROUND

With continuous growth of network requirements, a telecommunications operator needs to provide more technologies to cooperate with different customers, including sharing an infrastructure, providing a particular network function, integrating a partner's powerful and abundant software capabilities into a next-generation network system, and the like. Network slicing is an important technical means used in the next-generation network system to meet special network requirements of different users and different industries. Network slices are communication resources to ensure that a carried service can meet Service Level Agreement (SLA) requirements. These resources may be physically or logically isolated from each other based on different requirements. It may be considered that a network slice is a combination of network functions and resources that are needed to complete a particular service or some services, and is a complete logical network. In the next-generation network system, different tenants can deploy their own services by renting the telecommunications operator's network. For example, an electric power company can deploy its meter reading service by renting the telecommunications operator's network, and the telecommunications operator splits its own network into different network slices for different tenants to use.

In some approaches, during network slice deployment, after receiving a service request, a network management service designer needs to manually break down the service request, turn the service request into a network resource request, and send the network resource request to a network designer of a core network and a network designer of a radio access network separately. The network designer of the core network and the network designer of the radio access network separately deploy network devices, and then corresponding network devices are managed using a network element management unit.

In some approaches, however, network slice deployment needs to be manually performed, causing low network slice deployment efficiency.

SUMMARY

Embodiments of the present disclosure provide a management method, a management unit, and a system, to resolve a problem of low network slice deployment efficiency in other approaches.

According to one aspect, an embodiment of the present disclosure provides a management method. The method includes receiving, by a first management unit, a first management request, where the first management request carries requirement information of a network slice or indication information, and the indication information is used to obtain the requirement information of the network slice. The method further includes obtaining, by the first management unit, requirement information of a first subnet based on the requirement information of the network slice, where the network slice includes the first subnet, and determining, by the first management unit, requirement information of a first network resource required by the first subnet, where the requirement information of the first network resource is used to select, create, configure, activate, or request a first network resource instance that satisfies the requirement information of the first network resource.

In this embodiment of the present disclosure, after receiving the first management request that carries the requirement information of the network slice or the indication information, the first management unit can obtain the requirement information of the first subnet, determine, based on the requirement information of the first subnet, the requirement information of the first network resource required by the first subnet, and may further select, create, configure, activate, or request the first network resource instance based on the requirement information of the first network resource, in order to implement automatic network slice deployment based on the requirement information of the network slice, thereby improving network slice deployment efficiency.

The first management unit may be an entity having a network slice management function, such as a core network domain orchestrator unit, a radio access network domain orchestrator unit, or a core network element.

In a possible design, after obtaining the requirement information of the first subnet based on the requirement information of the network slice, the first management unit may further allocate an identifier of the first subnet or an identifier of the network slice.

In a possible design, the first management unit may further send a third management request to a third management unit, where the third management request carries the requirement information of the first network resource, and the third management request is used to request the first network resource instance.

Alternatively, the first management unit may select the first network resource instance from an existing network.

In a possible design, the network slice further includes a second subnet, and the first management unit may further send a second management request to a second management unit, where the second management request carries the requirement information of the network slice, such that the second management unit obtains requirement information of the second subnet based on the requirement information of the network slice. Alternatively, the first management unit may further obtain requirement information of the second subnet based on the requirement information of the network slice, and send a second management request to a second management unit, where the second management request carries the requirement information of the second subnet.

In a possible design, the second management request may further carry the identifier of the first subnet or the identifier of the network slice.

In a possible design, the first management unit allocates the identifier of the first subnet, the first management request further carries the identifier of the network slice, and in this case, the first management unit may further associate the identifier of the first subnet with the identifier of the network slice.

According to another aspect, an embodiment of the present disclosure provides another network slice management method. The method includes receiving, by a second management unit, a second management request from a first management unit, where the second management request carries requirement information of a second subnet. Alternatively, the method includes receiving, by a second management unit, a second management request from a first management unit, where the second management request carries requirement information of a network slice, such that the second management unit obtains requirement information of a second subnet based on the requirement information of the network slice. Then, the method includes determining, by the second management unit, requirement information of a second network resource that satisfies the requirement information of the second subnet, where the requirement information of the second network resource is used to select, create, configure, or activate a second network resource instance that satisfies the requirement information of the second network resource.

In this embodiment of the present disclosure, after obtaining the requirement information of the second subnet, the second management unit can determine the requirement information of the second network resource and obtain the second network resource instance, thereby implementing management of the second subnet.

The second management unit may be an entity, such as an access network element or a network function.

In a possible design, the second management unit may further send a fourth management request to a fourth management unit, where the fourth management request carries the requirement information of the second network resource, and the fourth management request is used to request the second network resource instance. Alternatively, the second management unit may select the second network resource instance from an existing network.

In a possible design, the second management unit may further allocate an identifier of the second subnet.

In a possible design, the second management request further carries an identifier of a first subnet or an identifier of the network slice, where the identifier of the first subnet or the identifier of the network slice is allocated by the first management unit. In this case, the second management unit may further associate the identifier of the second subnet with the identifier of the first subnet. Alternatively, the second management unit may further associate the identifier of the second subnet with the identifier of the network slice.

In the network slice management methods provided in the foregoing two aspects, the requirement information of the second subnet may include at least one of the following: a type of the second subnet, SLA information of the second subnet, deployment information of the second subnet, a key performance indicator (KPI) of the second subnet, or a functional characteristic of the second subnet.

SLA information of the network slice, deployment information of the network slice, a KPI of the network slice, a network characteristic of the network slice, user information of the network slice, or information about a service provided by the network slice.

The requirement information of the first subnet may include at least one of the following: a type of the first subnet, SLA information of the first subnet, deployment information of the first subnet, a KPI of the first subnet, or a functional characteristic of the first subnet.

The requirement information of the first network resource may include at least one of the following: a type of the first network resource, descriptor information of the first network resource, instance information of the first network resource, a KPI of the first network resource, or a functional characteristic of the first network resource.

The first network resource instance may include at least one of the following: a network function, a network element, a network service, or a transmission resource.

The requirement information of the second network resource may include at least one of the following: a type of the second network resource, descriptor information of the second network resource, instance information of the second network resource, a KPI of the second network resource, or a functional characteristic of the second network resource.

The second network resource instance may include at least one of the following: a network function, a network element, a network service, or a transmission resource.

According to still another aspect, an embodiment of the present disclosure provides a first management unit, where the first management unit has functions for implementing behavior of the first management unit in the foregoing method designs. The functions may be implemented by hardware, or may be implemented by hardware executing corresponding software. The hardware or software includes one or more modules that correspond to the foregoing functions.

In a possible design, the first management unit includes a processor, and the processor is configured to provide support for the first management unit to perform corresponding functions in the foregoing methods. Further, the first management unit may further include a communications interface, and the communications interface is configured to support communication between the first management unit and a second management unit, or communication between the first management unit and a third management unit, or communication between the first management unit and another unit. Further, the first management unit may further include a memory, and the memory is configured to couple to the processor and store data and a program instruction for the first management unit.

According to yet another aspect, an embodiment of the present disclosure provides a second management unit, where the second management unit has functions for implementing behavior of the second management unit in the foregoing method designs. The functions may be implemented by hardware, or may be implemented by hardware executing corresponding software. The hardware or software includes one or more modules that correspond to the foregoing functions.

In a possible design, the second management unit includes a processor, and the processor is configured to provide support for the second management unit to perform corresponding functions in the foregoing methods. Further, the second management unit may further include a communications interface, and the communications interface is configured to support communication between the second management unit and a first management unit, or communication between the second management unit and a fourth management unit, or communication between the second management unit and another unit. Further, the second management unit may further include a memory, and the memory is configured to couple to the processor and store data and a program instruction for the second management unit.

According to yet another aspect, an embodiment of the present disclosure provides a communications system, where the system includes the first management unit according to the foregoing aspects; or the system includes the first management unit and the second management unit according to the foregoing aspects.

According to a further aspect, an embodiment of the present disclosure provides a computer storage medium configured to store a computer software instruction used by the foregoing first management unit, where the computer software instruction includes a program designed to execute the foregoing aspects.

According to a further aspect, an embodiment of the present disclosure provides a computer storage medium configured to store a computer software instruction used by the foregoing second management unit, where the computer software instruction includes a program designed to execute the foregoing aspects.

According to a further aspect, an embodiment of the present disclosure provides a computer program product, where the computer program product includes an instruction, and when the computer program product is executed by a computer, the instruction enables the computer to perform the functions executed by the first management unit in the foregoing method designs.

According to a further aspect, an embodiment of the present disclosure provides a computer program product, where the computer program product includes an instruction, and when the program is executed by a computer, the instruction enables the computer to perform the functions executed by the second management unit in the foregoing method designs.

Compared with other approaches, in the solutions of the embodiments of the present disclosure, after receiving the first management request that carries the requirement information of the network slice or the indication information, the first management unit can first determine the requirement information of the first network resource required by the first subnet, and may further select, create, configure, activate, or request the first network resource instance based on the requirement information of the first network resource, in order to implement automatic network slice deployment based on the requirement information of the network slice, thereby improving network slice deployment efficiency.

DESCRIPTION OF EMBODIMENTS

The following describes the technical solutions in the embodiments of the present disclosure with reference to the accompanying drawings in the embodiments of the present disclosure.

A network architecture and a service scenario described in the embodiments of the present disclosure are intended to describe the technical solutions in the embodiments of the present disclosure more clearly but do not constitute any limitation on the technical solutions provided in the embodiments of the present disclosure. A person of ordinary skill in the art may learn that, with network architecture evolution and emergence of new service scenarios, the technical solutions provided in the embodiments of the present disclosure are also applicable to similar technical problems.

It should be understood that the term "and/or" in this specification describes only an association relationship for describing associated objects and represents that three relationships may exist. For example, A and/or B may represent the following three cases: only A exists, both A and B exist, and only B exists. In addition, the character "/" in this specification generally indicates an "or" relationship between the associated objects.

Figure 1:
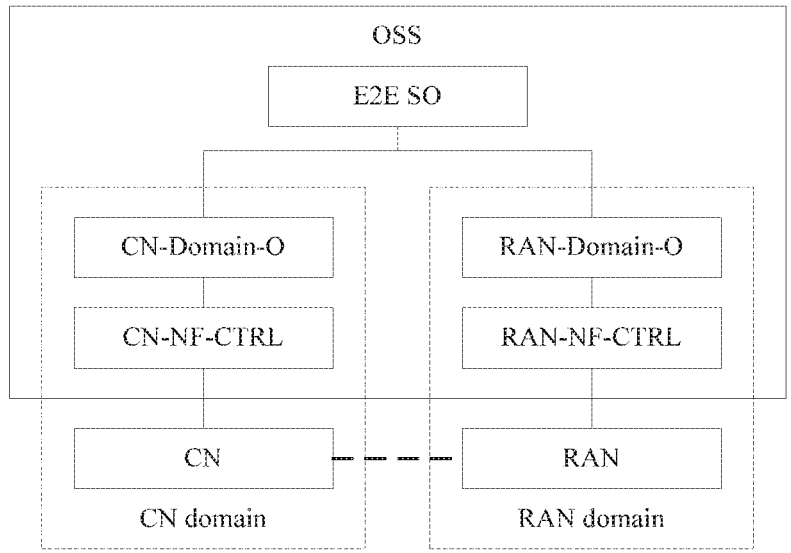
FIG. 1 is a schematic diagram of a possible network architecture according to an embodiment of the present disclosure.

With reference to FIG. 1, the following first describes a network architecture to which the embodiments of the present disclosure may be applicable.

FIG. 1 is a diagram of a possible system architecture for a network slice management method according to an embodiment of the present disclosure. As shown in FIG. 1, a system corresponding to the method relates to an operations support system and a communications network, including the following.

(1) Operations Support System (OSS)

(2) End-to-end orchestrator (E2E-O) unit: The E2E-O unit may alternatively be referred to as an end-to-end manager unit or an end-to-end orchestrator and manager unit, and may have some or all of the following functions.

End-to-end network slice management (for example, network slice lifecycle management, network slice template management, network slice fault management, network slice performance management, and network slice configuration management); end-to-end service management (for example, service lifecycle management, service template management, service fault management, service performance management, and service configuration management); end-to-end mapping of network slices, subnet slices, and network functions; coordination of network resources provided by different subdomains (for example, an access network domain, a core network domain, and a transmission domain); and unified orchestration of subnet slices and network functions provided by different subdomains, such that the subnet slices or network functions provided by different subdomains can satisfy a requirement of a target service (for example, an SLA requirement, a KPI requirement, or a quality of service (QoS) requirement). For ease of description, in the following description, a unit may be described by merely using its English short name. For example, the E2E-O unit may alternatively be represented by E2E-O, and this is similar for other units. Details are not described again later.

The E2E-O may include an end-to-end service orchestrator (E2E-SO) unit and an end-to-end network orchestrator (E2E-NO) unit. Alternatively, the E2E-O may only include either an E2E-SO unit or an E2E-NO unit.

It should be noted that, the functions of the E2E-O may alternatively be completed by an entity, such as a cross-domain orchestrator (CD-O) unit, a service orchestrator (SO) unit, a network orchestrator (NO) unit, or a network manager (NM) unit. In the embodiments of the present disclosure, all the following descriptions are made using the E2E-O as an example. However, it should be understood that this should not be construed as any limitation on the embodiments of the present disclosure.

(3) Core network domain orchestrator (CN-Domain-O) unit. The CN-Domain-O unit may alternatively be referred to as a core network domain manager and orchestrator unit, and may have some or all of the following functions.

Management of network slices within the core network domain (including network slice lifecycle management (creation, updating, and deletion), network slice fault management, network slice performance management, network slice configuration management, and the like); management of services within the core network domain (including service lifecycle management, service fault management, service performance management, service configuration management, and the like); and coordination of network resources within the core network domain, for unified orchestration.

The CN-Domain-O may include a core network domain service orchestrator (CN-Domain-SO) unit and a core network domain network orchestrator (CN-Domain-NO) unit, or may only include either a CN-Domain-SO unit or a CN-Domain-NO unit.

The functions of the CN-Domain-O may be completed by an entity, such as an SO unit, an NO unit, an NM, a network controller unit, or a network function virtualization and orchestrator unit. In the embodiments of the present disclosure, all the following descriptions are made using the CN-Domain-O as an example. However, it should be understood that this should not be construed as any limitation on the embodiments of the present disclosure.

(4) Radio access network domain orchestrator (RAN-Domain-O) unit. The RAN-Domain-O unit may alternatively be referred to as a radio access network domain orchestrator and manager unit, and may have some or all of the following functions.

Management of network slices within the access network domain (including network slice lifecycle management (creation, updating, and deletion), network slice fault management, network slice performance management, network slice configuration management, and the like); management of services within the access network domain (including service lifecycle management, service fault management, service performance management, service configuration management, and the like); and coordination of network resources within the access network domain, for unified orchestration.

The RAN-Domain-O may include a radio access network domain service orchestrator (RAN-Domain-SO) unit and a radio access network domain network orchestrator (RAN-Domain-NO) unit, or may only include either an RAN-Domain-SO unit or an RAN-Domain-NO unit.

Virtualization and orchestrator unit. In the embodiments of the present disclosure, all the following descriptions are made using the RAN-Domain-O as an example. However, it should be understood that this should not be construed as any limitation on the embodiments of the present disclosure.

(5) Core network function controller (CN-NF-CTRL) unit. The CN-NF-CTRL unit includes a network function manager (NF-M) unit and/or a virtualized network function manager (VNFM) unit in the core network domain, and is configured to perform lifecycle management, configuration management, fault management, performance management, and the like for network functions in the core network domain.

(6) Radio access network function controller (RAN-NF-CTRL) unit. The RAN-NF-CTRL unit includes an NF-M unit and/or a VNFM unit in the access network domain, and is configured to perform lifecycle management, configuration management, fault management, performance management, and the like for network functions in the access network domain.

(7) Core network (CN), such as a core network element or a core network function. The CN may be a particular network function or a plurality of network functions on a core network control plane. Alternatively, the CN may be a centralized control network function unit of a core network function.

(8) Radio access network (RAN), such as an access network element or an access network function. The RAN may be a particular network function or a plurality of network functions on an access network control plane. Alternatively, the RAN may be a centralized control network function unit of an access network function.

A relationship between the OSS and each of the E2E-O, the CN-Domain-O, and the RAN-Domain-O may be any one of the following cases. In a first case, the E2E-O is located in the OSS, but the CN-Domain-O and the RAN-Domain-O are not located in the OSS. In a second case, none of the E2E-O, the CN-Domain-O, and the RAN-Domain-O are located in the OSS. In a third case, all of the E2E-O, the CN-Domain-O, and the RAN-Domain-O are located in the OSS.

In addition, the CN-NF-CTRL and the RAN-NF-CTRL may be located in the OSS. Alternatively, the CN-NF-CTRL and the RAN-NF-CTRL may not be located in the OSS.

In the network architecture shown in FIG. 1, there is an interface between the E2E SO and each of the CN-Domain-O and the RAN-Domain-O. The E2E SO is connected through the CN-Domain-O to the CN-NF-CTRL and the CN in turn, and connected through the RAN-Domain-O to the RAN-NF-CTRL and the RAN in turn. There may be an interface or no interface between the CN and the RAN.

The following further describes the embodiments of the present disclosure in detail based on common aspects of the embodiments of the present disclosure.

The following describes the solutions in the embodiments of the present disclosure using the network architecture shown in FIG. 1 as an example. However, it should be noted that the solutions in the embodiments of the present disclosure may also be applied to another system.

In an existing solution, during network slice deployment, after receiving a service request, a network management service designer needs to manually break down the service request, turn the service request into a network resource request, and send the network resource request to a network designer of a core network and a network designer of a radio access network separately. The network designer of the core network and the network designer of the radio access network separately deploy network devices, and then corresponding network devices are managed using a network element management unit. This way of manually deploying a network slice is inefficient. Therefore, the embodiments of the present disclosure provide a management method, and a management unit and a system based on the method, to implement automatic network slice deployment, thereby improving network slice deployment efficiency.

Figure 2:
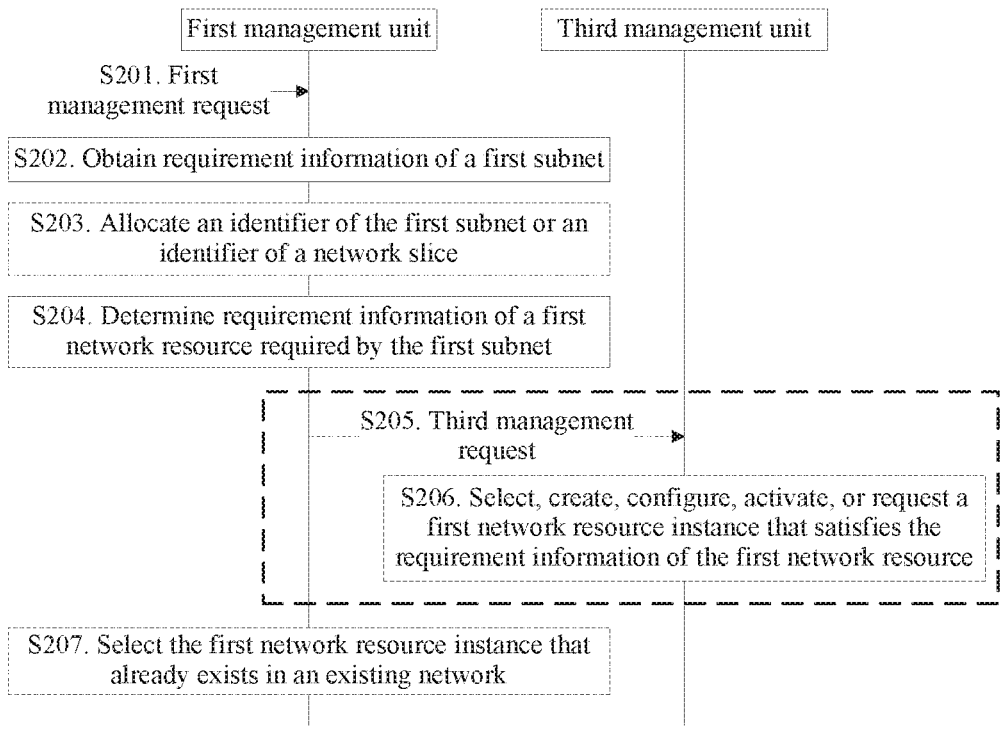
FIG. 2 is a schematic flowchart of a network slice management method according to an embodiment of the present disclosure.
Figure 3:
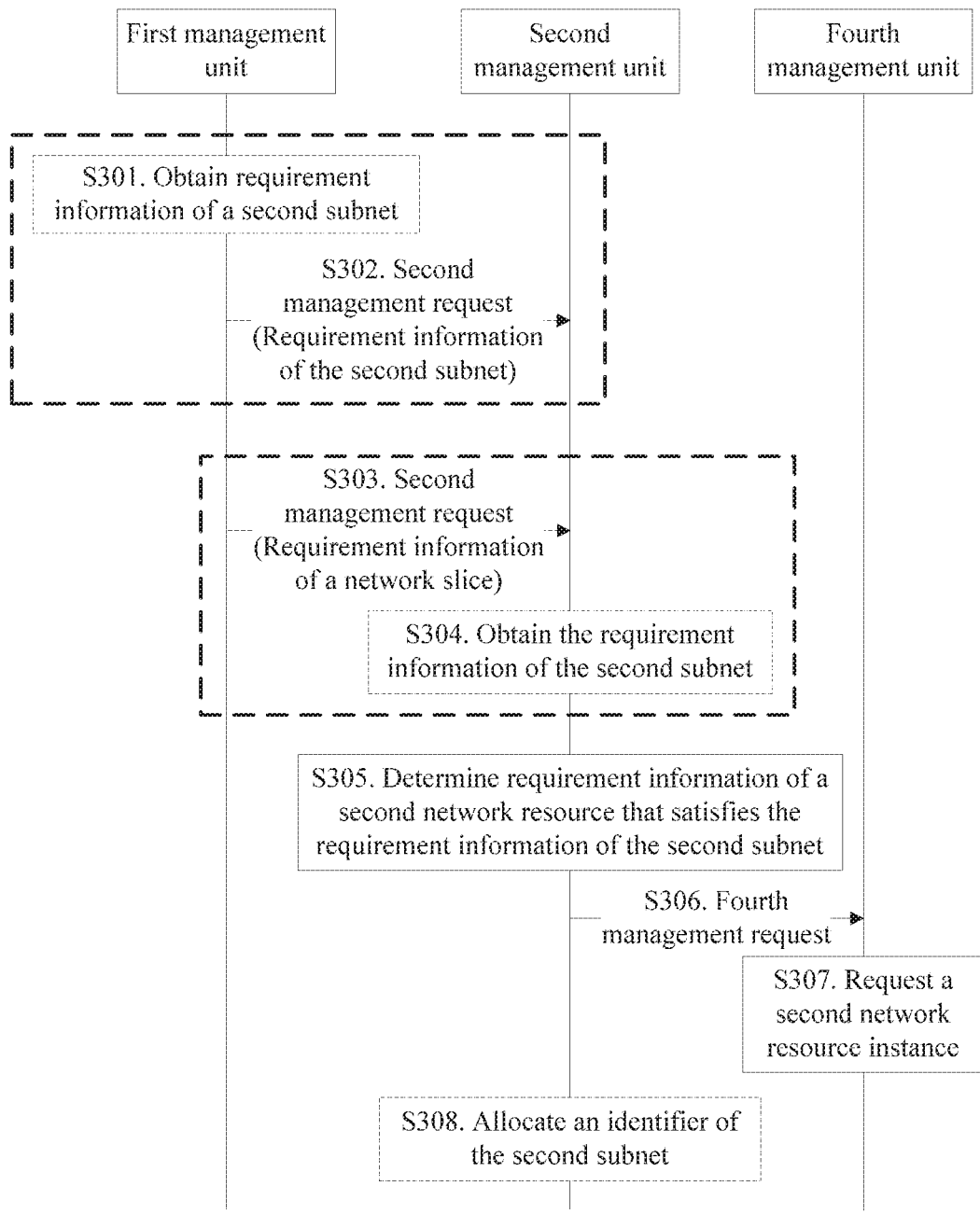
FIG. 3 is a schematic flowchart of another network slice management method according to an embodiment of the present disclosure.

With reference to FIG. 2 and FIG. 3, the following describes the solutions provided in the embodiments of the present disclosure.

FIG. 2 is a schematic communications diagram of a network slice management method according to an embodiment of the present disclosure. As shown in FIG. 2, the method includes S201 to S204, where S203 is optional.

S201. A first management unit receives a first management request.

The first management request carries requirement information of a network slice or indication information, and the indication information is used to obtain the requirement information of the network slice.

The first management unit may be the CN-Domain-O, the RAN-Domain-O, or the CN in FIG. 1.

In an example, an E2E-O may send the first management request to the first management unit. In another example, a user may send the first management request to the first management unit using an operable interface provided by a system. In yet another example, a BSS may send the first management request to the first management unit.

In an example, the requirement information of the network slice may include at least one of the following: a service type supported by the network slice, a type of the network slice, SLA information of the network slice, deployment information of the network slice, a KPI of the network slice, a network characteristic of the network slice, user information of the network slice, or information about a service provided by the network slice. The SLA information may include at least one of the following: a latency, a success rate, bandwidth, coverage, a traffic model, or the like. The KPI may include a maximum latency, maximum bandwidth, or the like.

S202. The first management unit obtains requirement information of a first subnet based on the requirement information of the network slice, where the network slice includes the first subnet.

In an example, the first management unit may obtain the requirement information of the first subnet according to a preset rule. Alternatively, the first management unit may negotiate with another management unit to determine the requirement information of the first subnet. The following describes examples of different manners in which the requirement information of the first subnet is obtained.

Manner 1: In this manner, the preset rule has been stored in advance in the first management unit. It is assumed that the first management unit is a CN-Domain-O, the first subnet is a CN domain, the requirement information of the network slice received by the first management unit includes SLA information such as a latency, coverage, and a call drop rate, and the preset rule stored in the first management unit is as follows. A call drop rate is related to only the CN domain, coverage is related to only an RAN domain, and a ratio of a latency in the CN domain to a latency in the RAN domain is 1:2. Then in the requirement information of the first subnet determined by the first management unit, a call drop rate is equal to the call drop rate in the received requirement information of the network slice, a latency is equal to one third the latency in the received requirement information of the network slice, and the requirement information of the first subnet does not include coverage information.

Manner 2: It is assumed that the first management unit is a CN-Domain-O. After receiving the requirement information of the network slice, the first management unit may send a negotiation request to an RAN-Domain-O, where the negotiation request may include information such as the requirement information of the network slice and allocation suggestions of the first management unit, for example, may include allocation suggestions on SLA information, such as a latency and a call drop rate. After receiving the negotiation request, the RAN-Domain-O determines new allocation suggestions based on a network running status of the RAN-Domain-O itself, and returns the new allocation suggestions to the first management unit. In this step, a plurality of negotiation attempts may be required to ultimately reach a negotiation consensus result.

In an example, the requirement information of the first subnet may include at least one of the following: a type of the first subnet, SLA information of the first subnet, deployment information of the first subnet, a KPI of the first subnet, or a functional characteristic of the first subnet.

It should be noted that the first subnet may be a subnet slice.

S203. The first management unit allocates an identifier of the first subnet or an identifier of the network slice.

In an example, the identifier of the network slice may include at least one of the following: a public land mobile network (PLMN) identifier, a tenant identifier, a slice type, a service type, a slice identifier, or the like.

In an example, the first management request received by the first management unit carries the identifier of the network slice, and the first management unit may further associate the identifier of the first subnet with the identifier of the network slice.

It should be noted that the identifier of the first subnet may be an identifier of a first subnet instance, and the identifier of the network slice may be an identifier of a network slice instance.

S204. The first management unit determines requirement information of a first network resource required by the first subnet.

The requirement information of the first network resource is used to select, create, configure, activate, or request a first network resource instance that satisfies the requirement information of the first network resource.

In an example, the first management unit may determine, based on a preset algorithm and/or a network slice descriptor, the requirement information of the first network resource required by the first subnet. The following describes examples of different manners in which the requirement information of the first network resource is determined.

Manner 1: The first management unit may obtain the preset algorithm in advance. After receiving the requirement information of the network slice, the first management unit may execute the preset algorithm using the obtained requirement information of the first subnet as input of the preset algorithm. Then the preset algorithm may output the corresponding requirement information of the first network resource. Alternatively, the first management unit may use the requirement information of the network slice, such as the SLA information, as input of the preset algorithm, and then the preset algorithm may output the corresponding requirement information of the first network resource.

Manner 2: If the first management request received by the first management unit carries the indication information of the network slice, the first management unit determines descriptor information of the network slice based on the indication information of the network slice. A descriptor of the network slice may be a network slice template, a network slice blueprint, or the like. The first management unit may determine the requirement information of the network slice based on the descriptor of the network slice, and then determine the requirement information of the first network resource based on the requirement information of the network slice. Alternatively, the first management unit may determine a subnet descriptor based on the obtained requirement information of the first subnet. Optionally, the subnet descriptor may be included in the descriptor of the network slice. Further, the first management unit determines the requirement information of the first network resource based on the subnet descriptor.

In an example, the requirement information of the first network resource may include at least one of the following: a type of the first network resource, descriptor information of the first network resource, instance information of the first network resource, a KPI of the first network resource, or a functional characteristic of the first network resource.

In an example, the first network resource may include at least one of the following: a network function, a network element, a network service, or a transmission resource.

In this embodiment of the present disclosure, after receiving the first management request that carries the requirement information of the network slice or the indication information, the first management unit obtains the requirement information of the first subnet based on the information, determines, based on the requirement information of the first subnet, the requirement information of the first network resource required by the first subnet, and may further select, create, configure, activate, or request the first network resource instance based on the requirement information of the first network resource, in order to implement automatic network slice deployment based on a network slice requirement, thereby greatly improving network slice deployment efficiency.

Optionally, the method shown in FIG. 2 may further include the following steps S205 and S206 Alternatively, the method shown in FIG. 2 may further include the following step S207.

S205. The first management unit sends a third management request to a third management unit.

The third management request carries the requirement information of the first network resource, and the third management request is used to request the first network resource instance.

The third management unit may be a CN-NF-CTRL or an RAN-NF-CTRL. In an embodiment, when the first management unit is a CN-Domain-O or a CN, the third management unit may be a CN-NF-CTRL. Alternatively, when the first management unit is an RAN-Domain-O, the third management unit may be an RAN-NF-CTRL.

S206. The third management unit selects, creates, configures, activates, or requests, based on the third management request, a first network resource instance that satisfies the requirement information of the first network resource.

In an example, when the requirement information of the first network resource carried in the third management request does not include instance information of the first network resource, the third management unit may select, deploy, configure, or activate the first network resource instance using the following process. First, the third management unit determines the requirement information of the first network resource instance, and then the third management unit selects, deploys, configures, or activates a first network resource instance that satisfies the requirement information of the first network resource instance.

In this embodiment of the present disclosure, after determining the requirement information of the first network resource required by the first subnet, the first management unit may request the first network resource instance that satisfies the requirement information of the first network resource from the third management unit, thereby improving network slice deployment efficiency.

S207. The first management unit selects a first network resource instance from an existing network.

In an embodiment, after determining the requirement information of the first network resource required by the first subnet, the first management unit determines whether a first network resource instance that satisfies the requirement information of the first network resource already exists in the existing network. If the first network resource instance exists, the first management unit directly selects the first network resource instance that satisfies the requirement information of the first network resource from the existing network.

In this embodiment of the present disclosure, after the first management unit determines the requirement information of the first network resource required by the first subnet, if a first network resource instance that satisfies the requirement information of the first network resource already exists in the existing network, the first management unit may directly select the first network resource instance from the existing network. Additionally, the first management unit does not need to request the first network resource instance from the third management unit any longer, thereby further improving network slice deployment efficiency.

In the solutions of the embodiments of the present disclosure, a method shown in FIG. 3 below may be further executed on a basis of executing the method shown in FIG. 2. FIG. 3 is a schematic communications diagram of another network slice management method according to an embodiment of the present disclosure. As shown in FIG. 3, the method may include S301, S302, and S305 to S307. Alternatively, the method may include S303 to S307.

S301. A first management unit obtains requirement information of a second subnet based on requirement information of a network slice.

The second subnet belongs to the network slice. In other words, the network slice further includes the second subnet.

In an example, the first management unit may obtain the requirement information of the second subnet according to a preset rule, or the first management unit may negotiate with another management unit to determine the requirement information of the second subnet. The following describes examples of different manners in which the requirement information of the second subnet is obtained.

Manner 1: In this manner, the preset rule has been stored in advance in the first management unit. It is assumed that the first management unit is a CN-Domain-O, the second subnet is an RAN domain, the requirement information of the network slice received by the first management unit includes SLA information such as a latency, coverage, and a call drop rate, and the preset rule stored in the first management unit is as follows. A call drop rate is related to only a CN domain, coverage is related to only the RAN domain, and a ratio of a latency in the CN domain to a latency in the RAN domain is 1:2. Then in the requirement information of the second subnet determined by the first management unit, coverage is equal to the coverage in the received requirement information of the network slice, a latency is equal to two thirds the latency in the received requirement information of the network slice, and the requirement information of the second subnet does not include call drop rate information.

Manner 2: It is assumed that the first management unit is a CN-Domain-O. After receiving the requirement information of the network slice, the first management unit may send a negotiation request to an RAN-Domain-O, where the negotiation request may include information such as the requirement information of the network slice and requirement allocation suggestions of the first management unit for the RAN-Domain-O, for example, may include allocation suggestions on SLA information, such as a latency and a call drop rate. After receiving the negotiation request, the RAN-Domain-O determines new allocation suggestions based on a network running status of the RAN-Domain-O itself, and returns the new allocation suggestions to the first management unit. In this step, a plurality of negotiation attempts may be required to ultimately reach a negotiation result.

S302. The first management unit sends a second management request to a second management unit, where the second management request carries the requirement information of the second subnet.

The second management unit may be an RAN or an RAN-Domain-O. In an embodiment, when the first management unit is a CN, the second management unit may be an RAN. Alternatively, when the first management unit is a CN-Domain-O, the second management unit may be an RAN-Domain-O.

In an example, the second management request may further carry an identifier of a first subnet or an identifier of the network slice.

In an example, the requirement information of the second subnet may include at least one of the following: a type of the second subnet, SLA information of the second subnet, deployment information of the second subnet, a KPI of the second subnet, or a functional characteristic of the second subnet.

S303. The first management unit sends a second management request to a second management unit, where the second management request carries the requirement information of the network slice.

In an example, the second management request may further carry an identifier of a first subnet or an identifier of the network slice.

S304. The second management unit obtains the requirement information of the second subnet based on the requirement information of the network slice.

In an example, the second management unit may obtain the requirement information of the second subnet according to a preset rule, or the second management unit may negotiate with another management unit to determine the requirement information of the second subnet. The following describes examples of different manners in which the requirement information of the second subnet is obtained.

Manner 1: In this manner, the preset rule has been stored in advance in the second management unit. It is assumed that the second management unit is an RAN-Domain-O, the second subnet is an RAN domain, the requirement information of the network slice received by the second management unit includes SLA information such as a latency, coverage, and a call drop rate, and the preset rule stored in the second management unit is as follows. A call drop rate is related to only a CN domain, coverage is related to only the RAN domain, and a ratio of a latency in the CN domain to a latency in the RAN domain is 1:2. Then in the requirement information of the second subnet determined by the second management unit, coverage is equal to the coverage in the received requirement information of the network slice, a latency is equal to two thirds the latency in the received requirement information of the network slice, and the requirement information of the second subnet does not include call drop rate information.

Manner 2: It is assumed that the second management unit is an RAN-Domain-O, and the second subnet is an RAN domain. After receiving the requirement information of the network slice, the second management unit may send a negotiation request to a CN-Domain-O, where the negotiation request may include information such as the requirement information of the network slice and allocation suggestions of the second management unit, for example, may include allocation suggestions on SLA information, such as a latency and a call drop rate. After receiving the negotiation request, the CN-Domain-O determines new allocation suggestions based on a network running status of the CN-Domain-O itself, and returns the new allocation suggestions to the second management unit.

In an example, the requirement information of the second subnet may include at least one of the following: a type of the second subnet, SLA information of the second subnet, deployment information of the second subnet, a KPI of the second subnet, or a functional characteristic of the second subnet.

S305. The second management unit determines requirement information of a second network resource that satisfies the requirement information of the second subnet, where the requirement information of the second network resource is used to select, create, configure, or activate a second network resource instance that satisfies the requirement information of the second network resource.

In an example, the requirement information of the second network resource may include at least one of the following: a type of the second network resource, descriptor information of the second network resource, instance information of the second network resource, a KPI of the second network resource, or a functional characteristic of the second network resource.

In an example, the second network resource instance may include at least one of the following: a network function, a network element, a network service, or a transmission resource.

S306. The second management unit sends a fourth management request to a fourth management unit, where the fourth management request carries the requirement information of the second network resource, and the fourth management request is used to request the second network resource instance.

When a third management unit is an RAN, the fourth management unit may be an RAN-NF-CTRL.

It should be noted that in addition to requesting the second network resource instance from the fourth management unit, the second management unit may select, based on the determined requirement information of the second network resource, the second network resource instance from an existing network. That is, the second management unit may select the second network resource instance that satisfies the requirement information of the second network resource in the existing network.

S307. The fourth management unit requests the second network resource instance based on the requirement information of the second network resource.

After receiving the management request, the fourth management unit may request the second network resource instance based on the requirement information of the second network resource.

In an example, when the requirement information of the second network resource carried in the fourth management request does not include instance information of the second network resource, the fourth management unit may select, deploy, configure, or activate the second network resource instance using the following process. First, the fourth management unit determines the requirement information of the first network resource instance. Then the fourth management unit selects, deploys, configures, or activates a second network resource instance that satisfies the requirement information of the second network resource instance.

Optionally, the method shown in FIG. 3 may further include S308.

S308. The second management unit allocates an identifier of the second subnet.

In an example, if the second management request sent by the first management unit to the second management unit in step S302 or S303 carries the identifier of the first subnet or the identifier of the network slice, after allocating the identifier of the second subnet, the second management unit may further associate the identifier of the second subnet with the identifier of the first subnet, or associate the identifier of the second subnet with the identifier of the network slice.

It should be noted that the identifier of the second subnet may be an identifier of a second subnet instance.

In this embodiment of the present disclosure, after receiving the requirement information of the network slice, the first management unit further obtains the requirement information of the second subnet on a basis of determining requirement information of the first network resource, and sends the requirement information of the second subnet to the second management unit. Alternatively, the first management unit may send the requirement information of the network slice to the second management unit, and the second management unit may obtain the requirement information of the second subnet based on the requirement information of the network slice, such that the second management unit determines the requirement information of the second network resource on this basis and completes an operation such as creating the second network resource instance, thereby implementing management of the first subnet and the second subnet.

Figure 4:
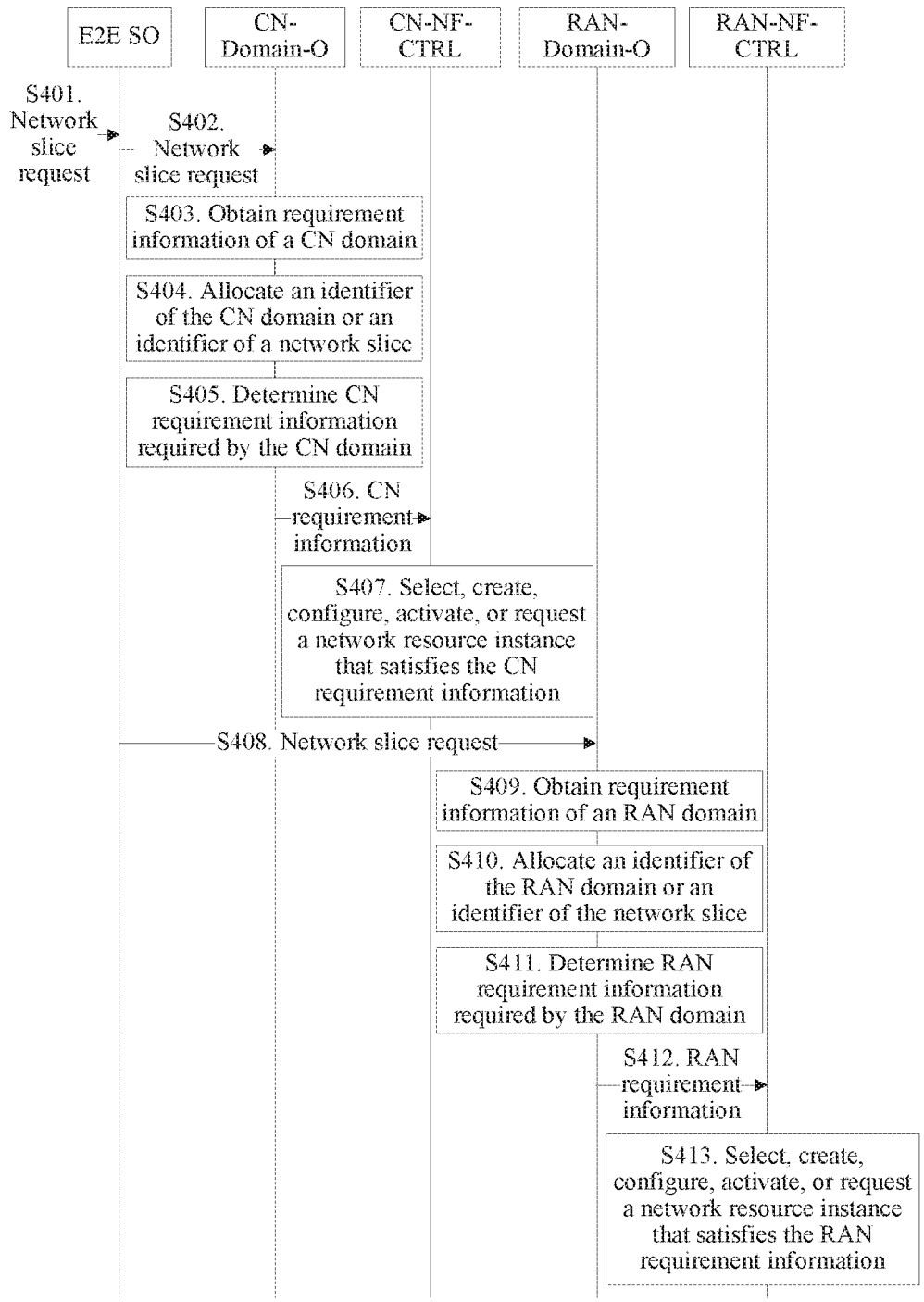
FIG. 4 is a schematic flowchart of still another network slice management method according to an embodiment of the present disclosure.
Figure 5:
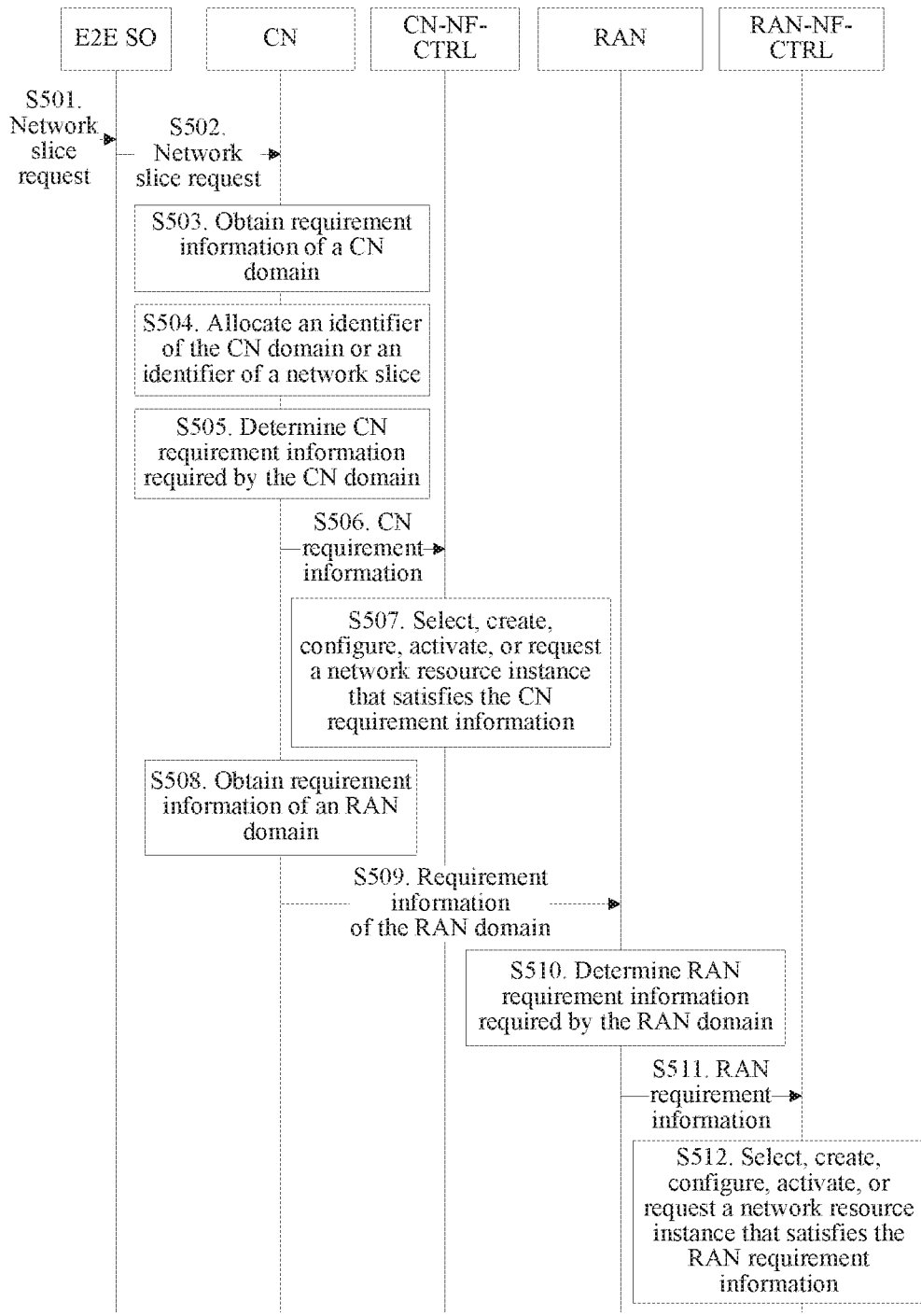
FIG. 5 is a schematic flowchart of yet another network slice management method according to an embodiment of the present disclosure.

With reference to FIG. 4 and FIG. 5, the following describes in detail the solutions provided in the embodiments of the present disclosure. In methods shown in FIG. 4 and FIG. 5, for content that is the same as or similar to content in FIG. 2 or FIG. 3, refer to the detailed description of FIG. 2 or FIG. 3. Details are not described again later.

FIG. 4 is a schematic communications diagram of still another network slice management method according to an embodiment of the present disclosure. In the method shown in FIG. 4, a solution in this embodiment of the present disclosure is described using an example in which a first management unit is a CN-Domain-O and a first subnet is a CN domain, or in which a first management unit is an RAN-Domain-O and a first subnet is an RAN domain. When the first management unit is a CN-Domain-O, a third management unit may be a CN-NF-CTRL. Alternatively, when the first management unit is an RAN-Domain-O, a third management unit may be an RAN-NF-CTRL. As shown in FIG. 4, the method includes the following steps.

S401. An E2E-O receives a network slice request.

The network slice request carries requirement information of a network slice. For introduction to the requirement information of the network slice, refer to the detailed description of FIG. 2. Details are not described herein again.

S402. The E2E-O forwards the network slice request to a CN-Domain-O.

The network slice request may be an example of the first management request in step S201 in FIG. 2. For detailed content of the network slice request, refer to the description of step S201.

S403. The CN-Domain-O obtains requirement information of a CN domain based on the network slice request.

For a detailed implementation process of this step, refer to the detailed implementation process of step S202 in FIG. 2.

S404. The CN-Domain-O allocates an identifier of the CN domain or an identifier of the network slice.

S405. The CN-Domain-O determines CN requirement information required by the CN domain.

For a detailed implementation process of this step, refer to the detailed implementation process of step S204 in FIG. 2.

S406. The CN-Domain-O sends the CN requirement information to a CN-NF-CTRL.

S407. The CN-NF-CTRL selects, creates, configures, activates, or requests, based on the CN requirement information, a network resource instance that satisfies the CN requirement information.

It should be noted that a process in which the CN-Domain-O requests a network resource instance from the CN-NF-CTRL is described in steps S406 and S407, and steps S406 and S407 are optional. If a network resource instance that satisfies the CN requirement information already exists in an existing network, S406 and S407 may not be performed. Instead, the CN-Domain-O directly selects the network resource instance that satisfies the CN requirement information from the existing network.

S408. The E2E-O forwards the network slice request to an RAN-Domain-O.

The network slice request may be an example of the first management request in step S201 in FIG. 2. For detailed content of the network slice request, refer to the description of step S201.

S409. The RAN-Domain-O obtains requirement information of an RAN domain based on the network slice request.

For a detailed implementation process of this step, refer to the detailed implementation process of step S202 in FIG. 2.

S410. The RAN-Domain-O allocates an identifier of the RAN domain or an identifier of the network slice.

S411. The RAN-Domain-O determines RAN requirement information required by the RAN domain.

For a detailed implementation process of this step, refer to the detailed implementation process of step S204 in FIG. 2.

S412. The RAN-Domain-O sends the RAN requirement information to an RAN-NF-CTRL.

S413. The RAN-NF-CTRL selects, creates, configures, activates, or requests, based on the RAN requirement information, a network resource instance that satisfies the RAN requirement information.

It should be noted that a process in which the RAN-Domain-O requests a network resource instance from the RAN-NF-CTRL is described in steps S412 and S413, and steps S412 and S413 are optional. If a network resource instance that satisfies the RAN requirement information already exists in an existing network, S412 and S413 may not be performed. Instead, the RAN-Domain-O directly selects the network resource instance that satisfies the RAN requirement information from the existing network.

It should be noted that in this embodiment of the present disclosure, an execution sequence of steps S402 to S407 and steps S408 to S413 is not limited. Steps S402 to S407 may be performed before steps S408 to S413. Alternatively, steps S408 to S413 may be performed before steps S402 to S407, or steps S402 to S407 and steps S408 to S413 may be concurrently performed.

In this embodiment of the present disclosure, the E2E-O sends the requirement information of the network slice to the CN domain and the RAN domain separately, the CN domain determines the CN requirement information and obtains the network resource instance of the CN domain, and the RAN domain determines the RAN requirement information and obtains the network resource instance of the RAN domain.

FIG. 5 is a schematic communications diagram of yet another network slice management method according to an embodiment of the present disclosure. In the method shown in FIG. 5, a solution in this embodiment of the present disclosure is described using an example in which a first management unit is a CN, a second management unit is an RAN, a third management unit is a CN-NF-CTRL, a fourth management unit is an RAN-NF-CTRL, a first subnet is a CN domain, and a second subnet is an RAN domain. As shown in FIG. 5, the method includes the following steps.

S501. An E2E-O receives a network slice request.

The network slice request carries requirement information of a network slice. For introduction to the requirement information of the network slice, refer to the detailed description of FIG. 2. Details are not described herein again.

S502. The E2E-O forwards the network slice request to a CN.

The network slice request may be an example of the first management request in step S201 in FIG. 2. For detailed content of the network slice request, refer to the description of step S201.

S503. The CN obtains requirement information of a CN domain based on the network slice request.

For a detailed implementation process of this step, refer to the detailed implementation process of step S202 in FIG. 2.

S504. The CN allocates an identifier of the CN domain or an identifier of the network slice.

S505. The CN determines CN requirement information required by the CN domain.

For a detailed implementation process of this step, refer to the detailed implementation process of step S204 in FIG. 2.

S506. The CN sends the CN requirement information to a CN-NF-CTRL.

S507. The CN-NF-CTRL selects, creates, configures, activates, or requests, based on the CN requirement information, a network resource instance that satisfies the CN requirement information.

Step S506 is similar to step S406 in FIG. 4, and step S507 is similar to step S407 in FIG. 4. For detailed implementation processes of steps S506 and S507, refer to the detailed descriptions of steps S406 and S407. Details are not described herein again.

S508. The CN obtains requirement information of an RAN domain based on the network slice request.

For a detailed implementation process of this step, refer to the detailed implementation process of step S301 in FIG. 3.

S509. The CN sends the requirement information of the RAN domain to an RAN.

It should be noted that a process in which the CN sends the requirement information of the RAN domain to the RAN after the CN obtains the requirement information of the RAN domain is described in steps S508 and S509, and steps S508 and S509 are optional. During implementation, the CN may not obtain the requirement information of the RAN domain but may directly send the requirement information of the network slice to the RAN, and the RAN obtains the requirement information of the RAN domain based on the requirement information of the network slice. For a detailed implementation process in which the RAN receives the requirement information of the network slice and obtains the requirement information of the RAN domain, refer to the detailed implementation processes of steps S303 and S304 in FIG. 3.

S510. The RAN determines RAN requirement information required by the RAN domain.

Optionally, the RAN may further allocate an identifier of the RAN domain. Further, the RAN may further associate the identifier of the RAN domain with the identifier of the CN domain, or the RAN may further associate the identifier of the RAN domain with the identifier of the network slice.

The RAN requirement information is used to select, create, configure, or activate a network resource instance that satisfies the RAN requirement information.

For a detailed implementation process of this step, refer to the detailed implementation process of step S305 in FIG. 3.

S511. The RAN sends the RAN requirement information to an RAN-NF-CTRL.

S512. The RAN-NF-CTRL selects, creates, configures, activates, or requests, based on the RAN requirement information, a network resource instance that satisfies the RAN requirement information.

Step S511 is similar to step S412 in FIG. 4, and step S512 is similar to step S413 in FIG. 4. For detailed implementation processes of steps S511 and S512, refer to the detailed descriptions of steps S412 and S413. Details are not described herein again.

It should be noted that in this embodiment of the present disclosure, an execution sequence of steps S503 to S507 and steps S508 to S512 is not limited. As an example, steps S503 to S507 may be performed before steps S508 to S512. As another example, steps S508 to S512 may be performed before steps S503 to S507. As yet another example, steps S503 to S507 and steps S508 to S512 may be concurrently performed.

In this embodiment of the present disclosure, the E2E-O sends the requirement information of the network slice to the CN, and the CN may determine the requirement information of the CN domain based on the requirement information of the network slice and obtain the network resource instance of the CN domain. Further, the CN may further determine the requirement information of the RAN domain based on the requirement information of the network slice, and send the requirement information of the RAN domain to the RAN. Alternatively, the CN may further send the requirement information of the network slice to the RAN, and the RAN determines the requirement information of the RAN domain based on the requirement information of the network slice, such that the RAN domain may obtain the network resource instance of the RAN domain.

The foregoing mainly describes the solutions in the embodiments of the present disclosure from a perspective of interaction between various units. It may be understood that, to implement the foregoing functions, each unit, such as the first management unit, the second management unit, the third management unit, and the fourth management unit, includes a corresponding hardware structure and/or a software module for performing each function. A person skilled in the art should be easily aware that, in combination with the examples described in the embodiments disclosed in this specification, units and algorithm steps in the embodiments of the present disclosure may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of the present disclosure.

In the embodiments of the present disclosure, division of functional module may be performed on the first management unit, the second management unit, the third management unit, the fourth management unit, and the like according to the foregoing method examples. For example, the functional modules may be divided based on the functions, or two or more functions may be integrated into one processing module. The integrated module may be implemented in a form of hardware, or may be implemented in a form of a software functional module. It should be noted that the module division in the embodiments of present disclosure is an example, and is merely logical function division, and there may be another division manner in actual implementation.

Figure 6:
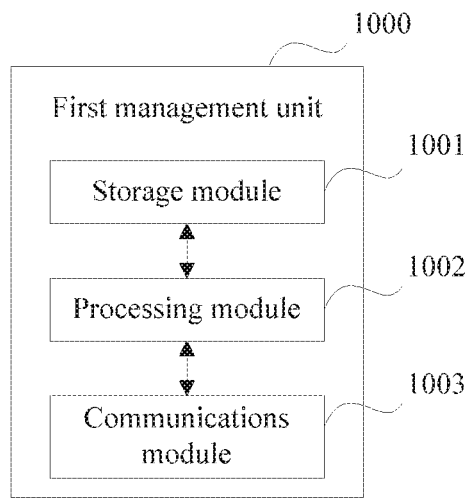
FIG. 6 is a schematic structural diagram of a first management unit according to an embodiment of the present disclosure.

FIG. 6 is a schematic diagram of a possible structure of a first management unit according to the foregoing embodiments when an integrated module is used. A first management unit 1000 includes a processing module 1002 and a communications module 1003. The processing module 1002 is configured to control and manage actions of the first management unit. For example, the processing module 1002 is configured to provide support for the first management unit to perform the processes of S207 and S201 to S205 in FIG. 2, the processes of S301 to S303 in FIG. 3, the processes of S403 to S406 or the processes of S409 to S412 in FIG. 4, the processes of S508, S509, and S503 to S506 in FIG. 5, and/or other processes of the technologies described in this specification. The communications module 1003 is configured to support communication between the first management unit and another network entity, for example, communication between the first management unit and a second management unit or communication between the first management unit and a third management unit. The first management unit may further include a storage module 1001 configured to store program code and data of the first management unit.

The processing module 1002 may be a processor or a controller, for example, may be a central processing unit (CPU), a general-purpose processor, a digital signal processor (DSP), an application-specific integrated circuit (ASIC), a field programmable gate array (FPGA) or another programmable logical device, a transistor logical device, a hardware component, or any combination thereof. The controller/processor may implement or execute various example logical blocks, modules, and circuits described with reference to content disclosed in the present disclosure. Alternatively, the processor may be a combination of processors implementing a computing function, for example, a combination of one or more microprocessors, or a combination of a DSP and a microprocessor. The communications module 1003 may be a communications interface, a transceiver, a transceiver circuit, or the like. The communications interface is a general term, and may include one or more interfaces, for example, an interface between the first management unit and the second management unit or between the first management unit and the third management unit. The storage module 1001 may be a memory.

Figure 7:
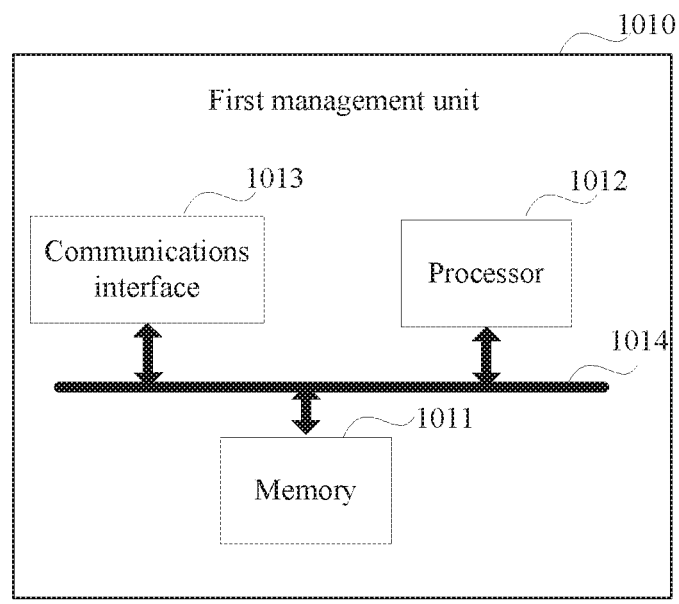
FIG. 7 is a schematic structural diagram of another first management unit according to an embodiment of the present disclosure.

When the processing module 1002 is a processor, the communications module 1003 is a communications interface, and the storage module 1001 is a memory, the first management unit in this embodiment of the present disclosure may be a first management unit shown in FIG. 7.

As shown in FIG. 7, the first management unit 1010 includes a processor 1012, a communications interface 1013, and a memory 1011. Optionally, the first management unit 1010 may further include a bus 1014. The communications interface 1013, the processor 1012, and the memory 1011 may be connected to each other using the bus 1014. The bus 1014 may be a Peripheral Component Interconnect (PCI) bus, or an Extended Industry Standard Architecture (EISA) bus, or the like. The bus 1014 may be classified into an address bus, a data bus, a control bus, and the like. For ease of representation, only one thick line is used to represent the bus in FIG. 7, but this does not mean that there is only one bus or only one type of bus.

The first management unit shown in FIG. 6 or FIG. 7 may be the CN-Domain-O, the RAN-Domain-O, or the CN in FIG. 1, or the like.

Figure 8:
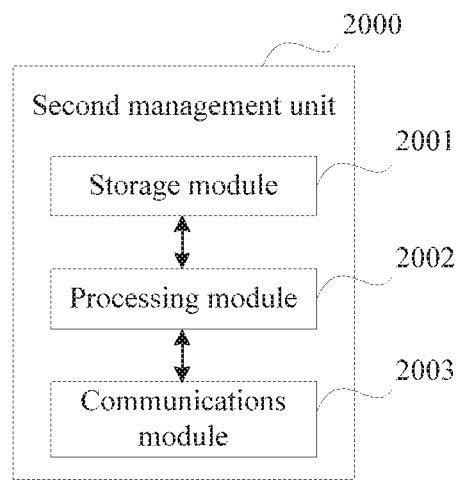
FIG. 8 is a schematic structural diagram of a second management unit according to an embodiment of the present disclosure.

FIG. 8 is a schematic diagram of a possible structure of a second management unit according to the foregoing embodiments when an integrated module is used. A second management unit 2000 includes a processing module 2002 and a communications module 2003. The processing module 2002 is configured to control and manage actions of the second management unit. For example, the processing module 2002 is configured to provide support for the second management unit to perform the processes of S308 and S304 to S306 in FIG. 3, the processes of S510 and S511 in FIG. 5, and/or other processes of the technologies described in this specification. The communications module 2003 is configured to support communication between the second management unit and another network entity, for example, communication between the second management unit and a first management unit or communication between the second management unit and a fourth management unit. The second management unit may further include a storage module 2001 configured to store program code and data of the second management unit.

The processing module 2002 may be a processor or a controller, for example, may be a CPU, a general-purpose processor, a DSP, an ASIC, an FPGA or another programmable logical device, a transistor logical device, a hardware component, or any combination thereof. The controller/processor may implement or execute various example logical blocks, modules, and circuits described with reference to content disclosed in the present disclosure. Alternatively, the processor may be a combination of processors implementing a computing function, for example, a combination of one or more microprocessors, or a combination of a DSP and a microprocessor. The communications module 2003 may be a communications interface, a transceiver, a transceiver circuit, or the like. The communications interface is a general term, and may include one or more interfaces, for example, an interface between the second management unit and the first management unit or between the second management unit and the fourth management unit. The storage module 2001 may be a memory.

Figure 9:
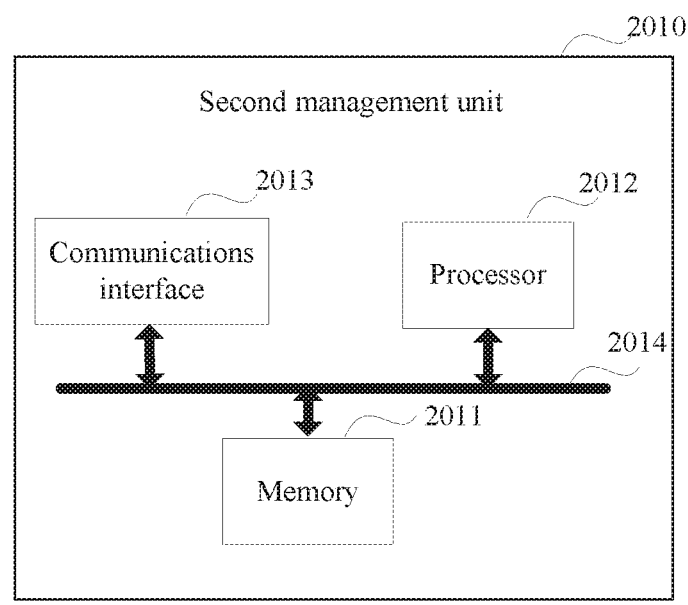
FIG. 9 is a schematic structural diagram of another second management unit according to an embodiment of the present disclosure.

When the processing module 2002 is a processor, the communications module 2003 is a communications interface, and the storage module 2001 is a memory, the second management unit in this embodiment of the present disclosure may be a second management unit shown in FIG. 9.

As shown in FIG. 9, the second management unit 2010 includes a processor 2012, a communications interface 2013, and a memory 2011. Optionally, the second management unit 2010 may further include a bus 2014. The communications interface 2013, the processor 2012, and the memory 2011 may be connected to each other using the bus 2014. The bus 2014 may be a PCI bus, an EISA bus, or the like. The bus 2014 may be classified into an address bus, a data bus, a control bus, and the like. For ease of representation, only one thick line is used to represent the bus in FIG. 9, but this does not mean that there is only one bus or only one type of bus.

The second management unit shown in FIG. 8 or FIG. 9 may be an RAN, or the like.

The embodiments of the present disclosure further provide a third management unit and a fourth management unit in the foregoing embodiments when an integrated module is used. The third management unit or the fourth management unit may have a structure similar to a structure of the first management unit.

For example, the third management unit may have a structure similar to the structure shown in FIG. 6, including a processing module and a communications module, and may further include a storage module. Alternatively, the third management unit may have a structure similar to the structure shown in FIG. 7, including a processor, a communications interface, and a memory, and may further include a bus. Optionally, the third management unit may be a CN-NF-CTRL or an RAN-NF-CTRL.

For example, the fourth management unit may have a structure similar to the structure shown in FIG. 6, including a processing module and a communications module, and may further include a storage module. Alternatively, the fourth management unit may have a structure similar to the structure shown in FIG. 7, including a processor, a communications interface, and a memory, and may further include a bus. Optionally, the fourth management unit may be an RAN-NF-CTRL.

For ease of description, the embodiments of the present disclosure do not further describe a structure of the third management unit and a structure of the fourth management unit. For related structural introduction to the third management unit or the fourth management unit, refer to the foregoing structural introduction to the first management unit or the second management unit.

The steps of the methods or algorithms described in combination with the content disclosed in the embodiments of the present disclosure may be implemented by hardware, or may be implemented by a processor executing a software instruction. The software instruction may include a corresponding software module. The software module may be stored in a random access memory (RAM), a flash memory, a read-only memory (ROM), an erasable programmable read only memory (EPROM), an electrically erasable programmable read only memory (EEPROM), a register, a hard disk, a removable hard disk, a compact disc read-only memory (CD-ROM), or any other form of storage medium well-known in the art. For example, a storage medium is coupled to a processor, such that the processor can read information from the storage medium or write information into the storage medium. Certainly, the storage medium may alternatively be a component of the processor. The processor and the storage medium may be located in an ASIC. In addition, the ASIC may be located in the first management unit, the second management unit, the third management unit, or the fourth management unit. Certainly, the processor and the storage medium may alternatively exist as discrete components in the first management unit, the second management unit, the third management unit, or the fourth management unit.

A person skilled in the art should be aware that in the foregoing one or more examples, functions described in the embodiments of the present disclosure may be implemented by hardware, software, firmware, or any combination thereof. When implemented by software, these functions may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another place. The storage medium may be any available medium accessible to a general-purpose or special-purpose computer.

In the foregoing implementations, the objectives, technical solutions, and beneficial effects of the embodiments of the present disclosure are further described in detail. It should be understood that the foregoing descriptions are merely example implementations of the embodiments of the present disclosure, but are not intended to limit the protection scope of the embodiments of present disclosure. Any modification, equivalent replacement, improvement, or the like made based on the technical solutions of the embodiments of the present disclosure shall fall within the protection scope of the embodiments of the present disclosure.

What is claimed is:

1. A management method comprising:
sending, by an end-to end orchestrator device, a first management request to a first management device;
receiving, by the first management device, the first management request, wherein the first management request carries requirement information of a network slice;
obtaining, by the first management device, requirement information of a first subnet based on the requirement information of the network slice, wherein the network slice comprises the first subnet, wherein the requirement information of the first subnet comprises Service Level Agreement (SLA) information of the first subnet; and
determining, by the first management device, requirement information of a first network resource required by the first subnet according to the requirement information of the first subnet, wherein the requirement information of the first network resource is for selecting or creating a first network resource instance that satisfies the requirement information of the first network resource.

2. The management method according to claim 1, further comprising:
sending, by the first management device, a second management request to a second management device, wherein the second management request carries the requirement information of the first network resource, and wherein the second management request is for requesting the first network resource instance; and
receiving, by the second management device, the second management request.

3. The management method according to claim 1, further comprising selecting, by the first management device, the first network resource instance from an existing network.

4. The management method according to claim 1, wherein the network slice further comprises a second subnet, and wherein the method further comprises:
sending, by the first management device, a second management request to a second management device, wherein the second management request carries the requirement information of the network slice such that the second management device obtains requirement information of the second subnet based on the requirement information of the network slice, and wherein the requirement information of the second subnet comprises SLA information of the second subnet; and receiving, by the second management device, the second management request.

5. The management method according to claim 4, wherein the second management request further carries an identifier of the first subnet, and wherein after obtaining, by the first management device, requirement information of the first subnet, the method further comprises allocating, by the first management device, the identifier of the first subnet.

6. The management method according to claim 5, wherein the first management device allocates the identifier of the first subnet, wherein the first management request further carries an identifier of the network slice, and wherein the method further comprises associating, by the first management device, the identifier of the first subnet with the identifier of the network slice.

7. The management method according to claim 1, wherein the requirement information of the network slice comprises SLA information of the network slice.

8. The management method according to claim 1, wherein the requirement information of the first network resource comprises at least one of a type of the first network resource, descriptor information of the first network resource, instance information of the first network resource, a key performance indicator (KPI) of the first network resource, or a functional characteristic of the first network resource.

9. The management method according to claim 1, wherein the first network resource instance comprises at least one of a network function, a network element, a network service, or a transmission resource.

10. A first management device comprising:
   at least one processor;
   a storage device coupled to the at least one processor; and
   a transceiver coupled to the at least one processor, wherein the at least one processor is configured to execute instructions stored on the storage device such that when executed, cause the at least one processor to:
      receive a first management request via the transceiver, wherein the first management request carries requirement information of a network slice;
      obtain requirement information of a first subnet based on the requirement information of the network slice, wherein the network slice comprises the first subnet, and wherein the requirement information of the first subnet comprises Service Level Agreement (SLA) information of the first subnet; and
      determine requirement information of a first network resource required by the first subnet according to the requirement information of the first subnet, wherein the requirement information of the first network resource is for selecting or creating a first network resource instance that satisfies the requirement information of the first network resource.

11. The first management device according to claim 10, wherein the instructions further cause the at least one processor to be configured to send a second management request to a second management device via the transceiver, wherein the second management request carries the requirement information of the first network resource, and wherein the second management request is for requesting the first network resource instance.

12. The first management device according to claim 10, wherein the instructions further cause the at least one processor to be configured to select the first network resource instance from an existing network.

13. The first management device according to claim 10, wherein the network slice further comprises a second subnet, and wherein the instructions further cause the at least one processor to be configured to:
   send a second management request to a second management device via the transceiver, wherein the second management request carries the requirement information of the network slice such that the second management device obtains requirement information of the second subnet based on the requirement information of the network slice, and wherein the requirement information of the second subnet comprises SLA information of the second subnet.

14. The first management device according to claim 10, wherein the instructions further cause the at least one processor to be configured to allocate an identifier of the first subnet or an identifier of the network slice.

15. The first management device according to claim 14, wherein the processor allocates the identifier of the first subnet, wherein the first management request further carries the identifier of the network slice, and wherein the instructions further cause the at least one processor to be configured to associate the identifier of the first subnet with the identifier of the network slice.

16. The first management device according to claim 10, wherein the requirement information of the network slice comprises at least one of a type of the network SLA information of the network slice.

17. A non-transitory computer readable medium having stored thereon a computer program product comprising instructions which, when executed by a processor, cause the processor to:
   receive a first management request, wherein the first management request carries requirement information of a network slice or indication information, and wherein the indication information is for obtaining the requirement information of the network slice;
   obtain requirement information of a first subnet based on the requirement information of the network slice, wherein the network slice comprises the first subnet, and wherein the requirement information of the first subnet comprises Service Level Agreement (SLA) information of the first subnet; and
   determine requirement information of a first network resource required by the first subnet according to the requirement information of the first subnet, wherein the requirement information of the first network resource is for selecting or creating a first network resource instance that satisfies the requirement information of the first network resource.

18. The non-transitory computer readable medium according to claim 17, wherein the instructions are further executable to cause the processor to:
   obtain requirement information of a second subnet based on the requirement information of the network slice, wherein the requirement information of the second subnet comprises SLA information of the second subnet; and
   send a second management request to a second management device, wherein the second management request carries the requirement information of the second subnet.

19. The management method according to claim 1, wherein the network slice further comprises a second subnet, and wherein the method further comprises:
   obtaining, by the first management device, requirement information of the second subnet based on the requirement information of the network slice, wherein the requirement information of the second subnet comprises SLA information of the second subnet;

sending, by the first management device, a second management request to a second management device, wherein the second management request carries the requirement information of the second subnet; and receiving, by the second management device, the second management request.

20. The first management device according to claim 10, wherein the network slice further comprises a second subnet, and wherein the instructions further cause the at least one processor to be configured to:

obtain requirement information of the second subnet based on the requirement information of the network slice, wherein the requirement information of the second subnet comprises SLA information of the second subnet; and send a second management request to a second management device via the transceiver, wherein the second management request carries the requirement information of the second subnet.

* * * * *

UNITED STATES PATENT AND TRADEMARK OFFICE
CERTIFICATE OF CORRECTION

| | | |
|---|---|---|
| PATENT NO. | : 10,924,966 B2 | Page 1 of 1 |
| APPLICATION NO. | : 16/422116 | |
| DATED | : February 16, 2021 | |
| INVENTOR(S) | : Ruiyue Xu et al. | |

It is certified that error appears in the above-identified patent and that said Letters Patent is hereby corrected as shown below:

In the Claims

Claim 5, Column 23, Line 6: should read:
"The management method according to claim 4, wherein the second management request further carries an identifier of the first subnet, and wherein after obtaining, by the first management device, the requirement information of the first subnet, the method further comprises allocating, by the first management device, the identifier of the first subnet."

Claim 16, Column 24, Line 26: should read:
"The first management device according to claim 10, wherein the requirement information of the network slice comprises SLA information of the network slice."

Signed and Sealed this
Sixth Day of April, 2021

Drew Hirshfeld
*Performing the Functions and Duties of the*
*Under Secretary of Commerce for Intellectual Property and*
*Director of the United States Patent and Trademark Office*